Patented Nov. 12, 1940

2,221,140

UNITED STATES PATENT OFFICE 2,221,140

PROCESS FOR BLEACHING MONTAN WAX

Michael Jahrstorfer, Ludwigshafen - on -the - Rhine, and Michael Aschenbrenner, Heidelberg, Germany, assignors, by mesne assignments, to General Aniline & Film Corporation, New York, N. Y., a corporation of Delaware No Drawing. Application December 17, 1937, Serial No. 180,324. In Germany December 23, 1936

5 Claims. (Cl. 260—423)

The present invention relates to a process for bleaching of montan wax.

We have found that montan wax can be bleached in a very advantageous manner by first treating the wax with hydrogen peroxide and then with chromic acid. There may be used for the process not only crude montan wax but also deresinified or otherwise pretreated montan wax which is still of dark color.

The wax to be bleached is heated to fusion either alone or after the addition of acid, neutral or alkaline aqueous or organic liquids, such as sulphuric acid, phosphoric acid, acetic acid, benzene sulphonic acid, or water or caustic soda solution, aqueous solution of potassium carbonate, or benzene, benzine, carbon tetrachloride and the like. Into the thoroughly mixed melt aqueous hydrogen peroxide is then allowed to flow and the mixture is kept for some time at the temperature necessary for bleaching while further stirring. The said temperature varies according to the amount and concentration of the hydrogen peroxide and the desired degree of bleaching but must always be above the melting point of the wax to be treated; generally speaking temperatures of from 90° to 130° C. are suitable. It is frequently advantageous to work under increased pressure whereby higher temperatures up to 150° may also be employed. The duration of the treatment depends on the amount and concentration of the hydrogen peroxide used, on the temperature and on the desired degree of bleaching of the wax as well as on the properties of the latter; generally speaking it amounts to from about 1 to 6 hours. The hydrogen peroxide may be used in various concentrations. Even dilute solutions containing 1 per cent of $H_2O_2$ are very active, but it is preferable to use solutions containing from 10 to 20 per cent of $H_2O_2$; in many cases even more concentrated solutions may be used.

After the treatment with the hydrogen peroxide the montan wax is subjected to the interaction of chromic acid, preferably in the presence of other acids easily soluble in water. For example the wax may be treated at a temperature above its melting point in the presence of water while stirring with chromic acid and sulphuric acid. Instead of chromic acid also sodium, potassium or ammonium bichromate may be employed. The sulphuric acid may be replaced by another acid easily soluble in water, such as acetic acid, nitric acid or phosphoric acid. The amount of the chromic acid to be used depends on the degree of purity of the wax, particularly from whether crude or purified or deresinified montan wax is to be employed as initial material, and on the bleaching effect which was obtained in the first stage of the process by the treatment of the wax with hydrogen peroxide. Preferably the chromic acid to be employed amounts to from about 40 to 200 per cent by weight calculated on the amount of the wax.

The amount of the water-soluble acids is generally to be calculated to the amount of the chromic acid or the bichromate employed. The amount must be sufficient to convert the chromic acid or the bichromate into the corresponding chromic salts of the acids employed. In many cases it is advantageous to employ excessive amounts of acids. The working temperature is preferably above the melting point of the wax, generally temperatures up to 140° C. are suitable. In some cases it may be advantageous of carrying out the treatment of the wax with chromic acid under superatmospheric pressure, for example under a pressure of from 2 to 15 atmospheres. Generally it is advantageous to allow chromic acid or a bichromate and a water-soluble acid, such as sulphuric acid either in admixture or in any sequence, if desired in several batches, to flow into the hot reaction mixture of the montan wax and hydrogen peroxide. For example the treatment of the wax with chromic acid is carried out in the manner described in the U. S. Patent 1,777,766. The duration of the treatment depends on the nature of the initial substance, and the working conditions employed. Generally the treatment is carried out until the chromic acid or the bichromate is practically completely converted into the corresponding chromium salt.

As soon as the reaction is finished the mixture separates in two layers, an upper layer which consists of the bleached montan wax and a bottom layer which consists of an aqueous chromium salt solution which is removed. The wax separated is washed first with diluted sulphuric acid and then with water. Thereupon it is freed from any water by warming preferably under diminished pressure. The chromic salt solution can be converted into a chromic acid solution by electrolytic oxidation, which solution may be employed anew for bleaching of montan wax.

The amount of hydrogen peroxide on the one hand and of chromic acid on the other hand to be used according to the present invention may be varied within wide limits. The general rule is that the larger the amount of hydrogen peroxide used, the smaller the amount of chromic acid necessary for the production of a certain degree of paleness of the final product and vice versa. Amounts of 5 per cent, calculated with reference to 100 per cent hydrogen peroxide and the wax used, already effect a marked lightening in color of the wax and in this case even a relatively gentle after treatment with chromic acid is sufficient. The products contain a larger amount of esters the more hydrogen peroxide and the less chromic acid used in the bleaching.

The waxes obtained differ considerably from the products obtained by using only one of the two bleaching methods. Products bleached with hydrogen peroxide alone have the drawback that their pale color is not stable. Thus a montan wax which has been bleached with hydrogen peroxide becomes black after heating at from 120° to 130° C. for a short time. By a short aftertreatment of a wax bleached with hydrogen peroxide with chromic acid, however, the pale color obtained by the bleaching with hydrogen peroxide becomes stable. Since the bleaching with hydrogen peroxide only slightly changes the chemical constitution of the wax and in particular only effects a slight splitting of the wax esters, while on the other hand the bleaching with chromic acid yields a product rich in free wax acids, it is possible by using more or less energetic working conditions in the two stages of the process to obtain waxes having quite different composition and different properties. Generally speaking the products obtained are distinguished by great hardness and good emulsifiability. They are particularly suitable for esterifying with mono- or divalent alcohols. These esters are advantageously suitable for preparing emulsions which yield when brought upon smooth surfaces without rubbing excellent drybright polishes. Furthermore the said esters are suitable for the preparation of wax mixtures for the production of carbon papers. The process according to the present invention also permits of converting montan wax which has not been freed from resin into a pale valuable wax product with relatively small amounts of bleaching agent.

The following examples will further illustrate the nature of this invention but the invention is not restricted to these examples.

Example 1

500 liters of 10 per cent hydrogen peroxide are allowed to flow during the course of 4 hours into 1000 kilograms of deresinified, fused montan wax while stirring well at about 100° C., the mixture being further stirred for about an hour at the same temperature. 3500 liters of 40 per cent sulphuric acid and then a solution of 800 kilograms of chromic anhydride in an equal amount of water are slowly added. When the chromic acid has been used up, the wax is washed first with sulphuric acid and then with water. There are obtained 900 kilograms of a pale hard wax having the following characteristics:

Acid value_____ 92.4
Saponification value_____ 142
Ester value_____ 50.

Example 2

1000 kilograms of crude montan wax are fused and then 4500 kilograms of 40 per cent sulphuric acid are added. 500 liters of 30 per cent hydrogen peroxide are added a little at a time and the whole stirred for 3 hours at 105° C. 1000 kilograms of chromic anhydride are slowly added to the mixture and the whole stirred until the chromic anhydride has been used up. The mixture is worked up as described in Example 1. There are obtained 850 kilograms of a pale product having an acid value of 95.2 and a saponification value of 142.

Example 3

1000 kilograms of deresinified montan wax are fused and emulsified in 500 liters of water. 300 liters of 10 per cent hydrogen peroxide are added a little at a time to the emulsion and the whole is stirred for 6 hours at 95° C. 400 kilograms of chromic anhydride and a corresponding amount of sulphuric acid are then added slowly and the bleaching completed. A pale wax is obtained having an acid value of 77 and a saponification value of 137.

What we claim is:

1. The process for bleaching of montan wax, which comprises treating the wax first with hydrogen peroxide and then with chromic acid in the presence of another acid easily soluble in water.

2. The process for bleaching of deresinified montan wax, which comprises treating the wax first with hydrogen peroxide and then with chromic acid in the presence of sulphuric acid.

3. The process for bleaching of montan wax, which comprises treating the wax at a temperature above the melting point of the wax with hydrogen peroxide and then with chromic acid in the presence of another acid easily soluble in water.

4. The process for bleaching of montan wax, which comprises dissolving the wax in an organic liquid and treating the solution with hydrogen peroxide and then with chromic acid in the presence of another acid easily soluble in water.

5. The process for bleaching of montan wax, which comprises treating the wax first with hydrogen peroxide and then with an alkali bichromate in the presence of sulphuric acid.

MICHAEL JAHRSTORFER.
MICHAEL ASCHENBRENNER.